United States Patent [19]
Sie et al.

[11] Patent Number: 6,019,951
[45] Date of Patent: *Feb. 1, 2000

[54] CATALYTIC REACTOR

[75] Inventors: Swan Tiong Sie, Hilversum, Netherlands; Andrzej Cybulski, Warsaw, Poland; Jacob Moulijn, den-Haag, Netherlands

[73] Assignee: Technische Universiteit Delft, BL Delft, Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 08/428,254

[22] PCT Filed: Nov. 4, 1993

[86] PCT No.: PCT/NL93/00231

§ 371 Date: Jul. 21, 1995

§ 102(e) Date: Jul. 21, 1995

[87] PCT Pub. No.: WO94/09901

PCT Pub. Date: May 11, 1994

[30] Foreign Application Priority Data

Nov. 4, 1992 [NL] Netherlands ............................ 9201923

[51] Int. Cl.⁷ ................................ B01J 35/04; B01J 19/32
[52] U.S. Cl. ............................. 422/222; 422/177; 422/180; 422/211; 502/527.19; 502/527.21
[58] Field of Search ..................................... 422/171, 177, 422/180, 190, 191, 193, 195, 211, 222; 208/112; 502/439, 527.16, 527.19, 527.21; 425/464, 463; 264/177.12; 261/94

[56] References Cited

U.S. PATENT DOCUMENTS

| | | | |
|---|---|---|---|
| 2,212,932 | 8/1940 | Fairlie | 502/527.16 |
| 3,425,810 | 2/1969 | Scott, Jr. | 422/191 |
| 3,489,208 | 1/1970 | Manteufel | 502/527.16 |
| 3,489,809 | 1/1970 | Keith et al. | 502/527 |
| 4,135,018 | 1/1979 | Bonin et al. | 428/116 |
| 4,323,614 | 4/1982 | Gulati | 428/116 |
| 4,364,761 | 12/1982 | Berg et al. | 55/523 |
| 4,510,262 | 4/1985 | Kim et al. | 502/527.16 |
| 4,687,433 | 8/1987 | Ozaki et al. | 425/464 |
| 4,767,309 | 8/1988 | Mizuno et al. | 425/464 |

FOREIGN PATENT DOCUMENTS

| | | |
|---|---|---|
| 191982 | 8/1986 | European Pat. Off. . |
| 226306 | 6/1987 | European Pat. Off. . |
| 279159 | 8/1988 | European Pat. Off. . |
| 2346048 | 10/1977 | France . |

*Primary Examiner*—Hien Tran
*Attorney, Agent, or Firm*—Michaelson & Wallace; Peter L. Michaelson

[57] ABSTRACT

There is described a catalyst element (1) consisting of an integral whole having channels (2) extending therethrough. These channels (2) have, in circumferential sense of the cross section thereof, at least one concave wall portion and at least one convex wall portion, preferably provided by longitudinal projections (4) or grooves (7). As a result, a liquid phase (10) will preferentially be located in cavities (5) defined along the channel walls, and a gas phase (20) will preferentially be located centrally in the channels (2). Consequently, the catalyst element (1) according to the invention offers the possibility of being operated in countercurrent mode with only a slight loss of pressure.

8 Claims, 13 Drawing Sheets

CATALYTIC REACTOR

The invention relates to a reactor for reacting catalytically therein at least one gas and at least one liquid.

The invention particularly relates to such reactor for treating oil products, such as for instance the desulfurization of heavy oil by means of hydrogen gas, for which reason the invention will be explained hereinafter with reference to this practical example, but it is emphasized that the invention is not limited to this use.

In practice, desulfurization of heavy oil by means of hydrogen gas takes place in a reactor filled with granular catalyst material, which is state of the art for such reactor. Accordingly, each separate catalyst element has the shape of a granule and can for instance have the shape of a sphere, an elongate cylinder or a flat cylinder (pill) The catalyst granules are dumped in a random manner, and the mutually supporting catalyst granules define a capricious pattern of passageways therebetween. The heavy oil and the hydrogen gas are pressed through these passageways and react with each other, the material of the granules playing a catalyzing part.

This involves various problems.

A first problem concerns the size of the separate catalyst granules. The greater the granules are chosen to be, the smaller the available exterior catalyst surface area in proportion to the catalyst volume or catalyst weight. If the catalyst material consists of a porous support including the active catalyst, this means that in the case of greater granules it becomes increasingly difficult to allow the active catalyst located in the interior of the catalyst granules to contribute efficiently to the reaction (diffusion limitation) to be catalyzed. Hence, a greater dimension of the catalyst granules is accompanied by a reduced efficiency.

However, the smaller the granules are chosen to be, the greater the flow resistance of the catalyst bed. Given the same yield, this means a greater pressure drop over the catalyst, which is synonymous with a greater loss of energy, and for forcing the substances to be reacted a greater power is needed.

A second problem concerns the manner in which the substances to be reacted can flow through the catalyst material. Due to the relatively great pressure drop over the catalyst material, it is practically impossible, at least for large-scale use, to allow the gas and the liquid to flow countercurrently. A method wherein the oil is allowed to drip from the top downwards through the catalyst bed and wherein the hydrogen gas is blown from the bottom upwards, is commercially pointless because of the slight maximum speed that can be used.

Therefore, it is known to present the oil and the hydrogen gas under a relatively high pressure to the reactor and to have them flow through the catalyst bed in the same direction. However, a number of important drawbacks are attached to the operation in such co-current mode, in particular when a gaseous reaction product is formed in the reaction to be catalyzed, such as is the case in the desulfurization of heavy oil by means of hydrogen gas, wherein in fact $H_2S$ is formed. The further the liquid progresses in the reactor, the more it is polluted with that gaseous reaction product, which counteracts the reaction to be catalyzed. Further, the liquid, as it progresses further in the catalyst bed, will increase or decrease in temperature more and more, depending on whether the reaction to be catalyzed is exothermic or endothermic, so that in a commercial reactor provisions have to be made for maintaining the temperature within certain limits.

The object of the invention is to overcome the above-mentioned drawbacks.

In particular, a first object of the invention is to provide a reactor having catalyst elements whose active catalyst can be used highly efficiently, while yet these catalyst elements have only a relatively slight flow resistance.

A further object of the invention is to provide a reactor which is in particular suitable for being driven in a countercurrent mode.

To this end, according to the invention, the reactor of the above-mentioned type is characterized by comprising at least one catalyst element having at least one channel extending therethrough, the wall of said channel, in circumferential sense of the cross section thereof, having at least one concave wall portion and at least one convex wall portion in order to effect a separation between the gas phase and the liquid phase.

Within the scope of the present application, a transition between two wall portions intersecting at an angle smaller than 180° will also be considered to be "concave", and a transition between two wall portions intersecting at an angle greater than 180° will also be considered to be "convex".

In a preferred embodiment, the wall of the channel mentioned comprises at least one longitudinal projection and/or at least one longitudinal groove.

It is observed that a catalyst element having a plurality of channels extending therethrough having finned walls is known per se from EP-A-0.191.982. However, this known catalyst element is only suitable for having a gas (mixture) flow therethrough, such as for instance in the case where exhaust gas of an internal combustion motor is cleaned. If this known catalyst element was used for having a gas and a liquid flow countercurrently, stagnation phenomena would occur in the channels which would increase the flow resistance and reduce the efficiency.

Because the wall of the catalyst channel according to the present invention comprises at least one longitudinal projection and/or at least one longitudinal groove, a separation between the gas phase on the one hand and the liquid phase on the other is automatically effected, so that no stagnation occurs and the flow resistance remains low.

BRIEF DESCRIPTION OF THE DRAWINGS

The invention will be further explained hereinafter by a description of preferred embodiments of the catalyst element according to the invention, with reference to the drawings. In these drawings..

In the figures identical or comparable parts are designated by the same reference numerals.

Figure 1:
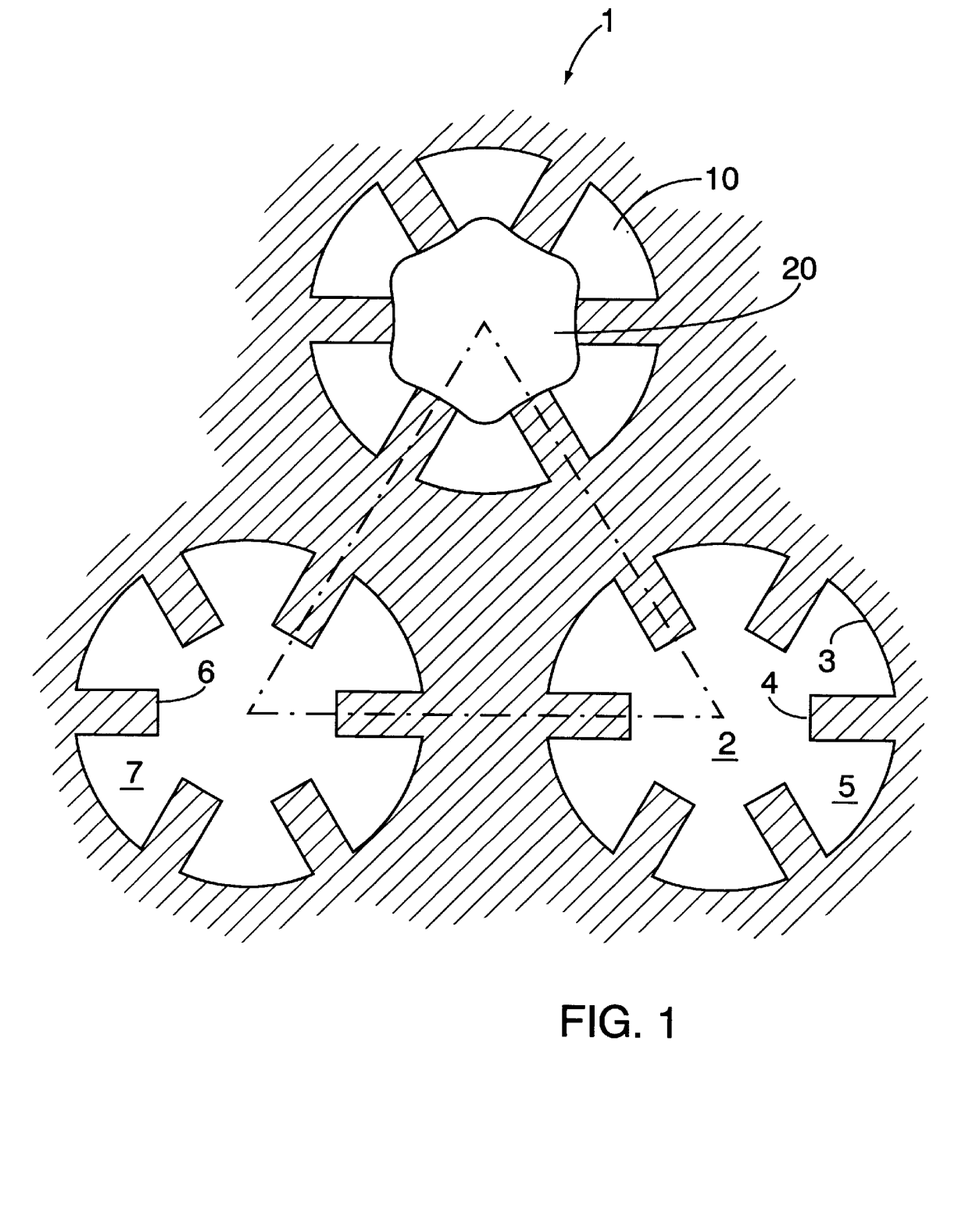
FIG. 1 shows a section of a portion of the catalyst element according to the invention, which portion comprises three channels.

FIG. 1 shows a partial section of a catalyst element 1 according to the invention. FIG. 1 shows three channels 2 with a channel wall 3. In a practical embodiment, the catalyst element 1 as a whole may for instance have a rectangular or hexagonal cross section having cross dimensions in the order of for instance 50 cm and the channels 2 may have cross dimensions in the order of approximately 1–10 mm. It will then be understood that the pattern of channels 2 may continue in a "dense packing", although this is not shown separately.

The catalyst element 1 may be produced from a support material, for instance a ceramic material or a metal for a proper heat conduction, on which a thin layer of the actual catalyst material is provided, which layer accordingly forms the boundary surface of each channel. However, in a preferred embodiment which is in particularly suitable for the desulfurization of oil by means of hydrogen gas, the catalyst element 1 is integrally produced from catalyst material, such as for instance a porous matrix impregnated with active substance. An ale thereof is γ-alumina having in at least a part of the pores thereof W, Co, Mo, Ni, or Mn atoms as active substance, or combinations of these atoms.

The channels 2 shown in FIG. 1 have a circular section. The channel wall 3 of each channel 2 comprises six projections 4 extending in the longitudinal direction of the channels 2. Each projection 4 can be considered to be a convex wall portion and each wall portion between adjacent projections 4 can be considered to be a concave wall portion.

As shown in FIG. 1 in only one of the channels shown, the liquid phase 10 will tend to be mainly located in the spaces 5 surrounded by the channel wall 3 and the projections 4. The greater the degree of humidification between the liquid phase 10 and the material of the catalyst 1, the greater this tendency. Centrally in the channel 2, the liquid phase 10 will leave clear space for the gas phase 20. Consequently, the liquid flow and the gas flow do not interfere with each other, so that it is possible to operate the catalyst element 1 in a countercurrent mode in which the liquid phase 10 and the gas phase 20 flow countercurrently, while the pressure drop occurring is only slight.

Various configuration variants are possible, a number of which will be described hereinafter. However, this description should not be considered an exhaustive ennumeration.

Figure 2A:
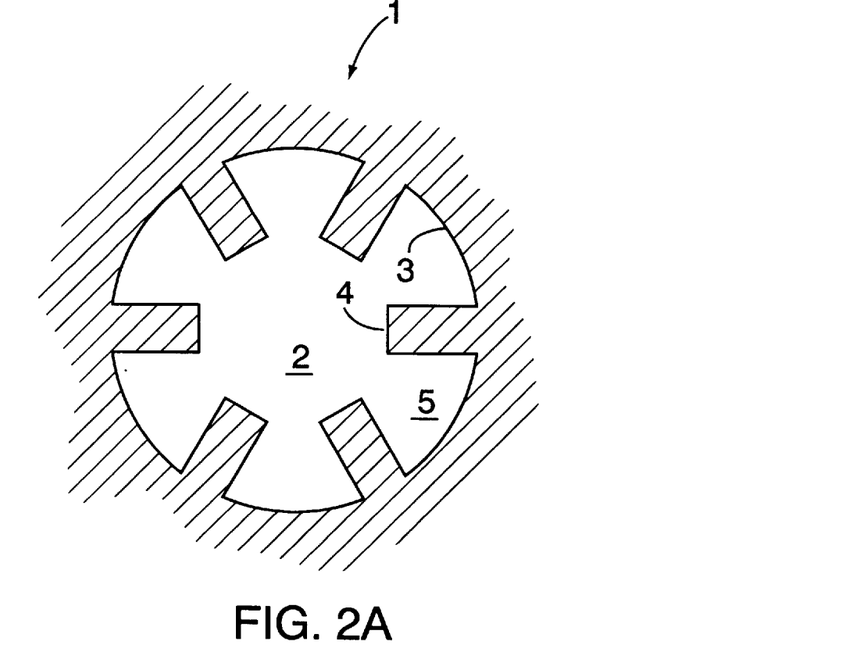
FIG. 2A–L shows different configuration variants of the channel in a catalyst element according to the invention.

The walls of the projections may for instance extend radially (FIG. 2A). However, when the two walls of each projection are parallel to each other, as in the embodiment illustrated in FIG. 1, this offers the advantage that the catalyst material in each projection, calculated in the height direction of that projection, is used equally efficiently.

Figure 2B:
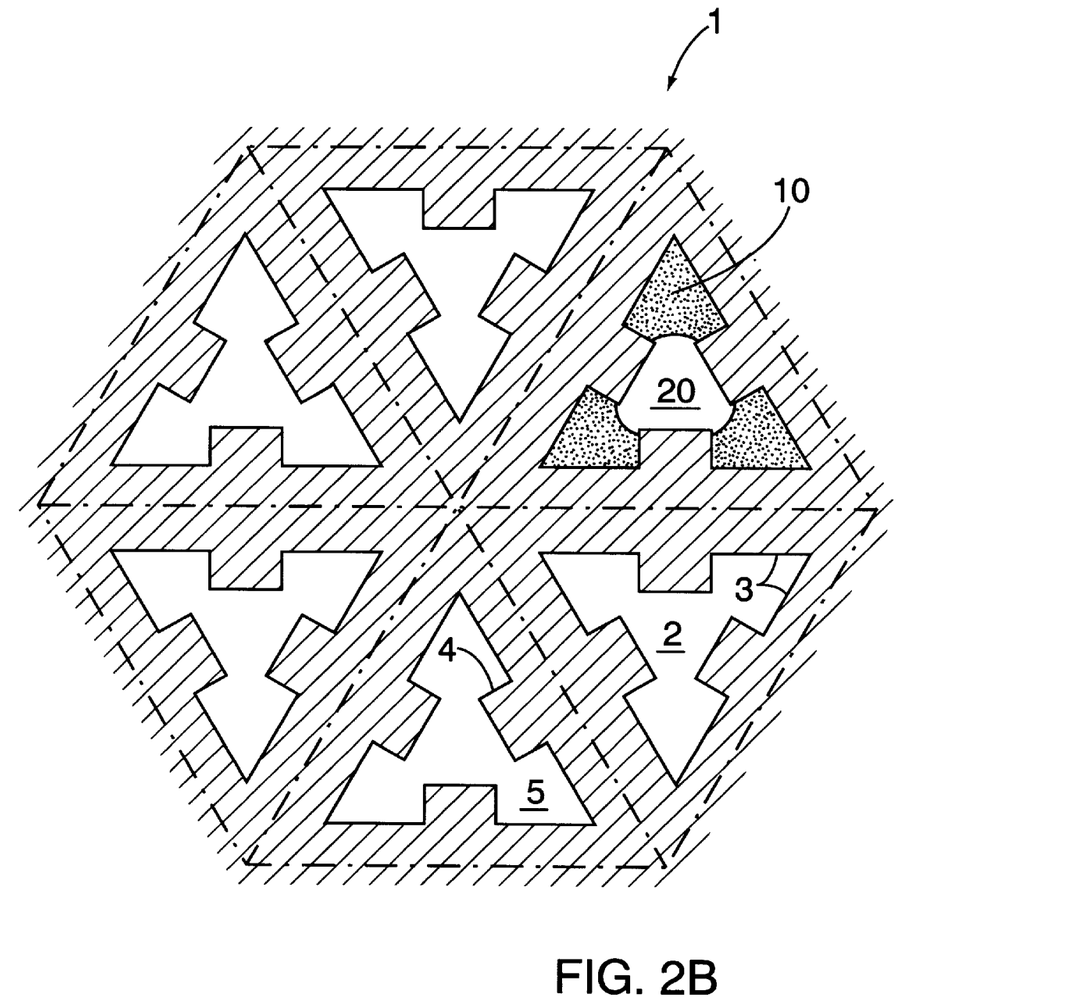
Figure 2C:
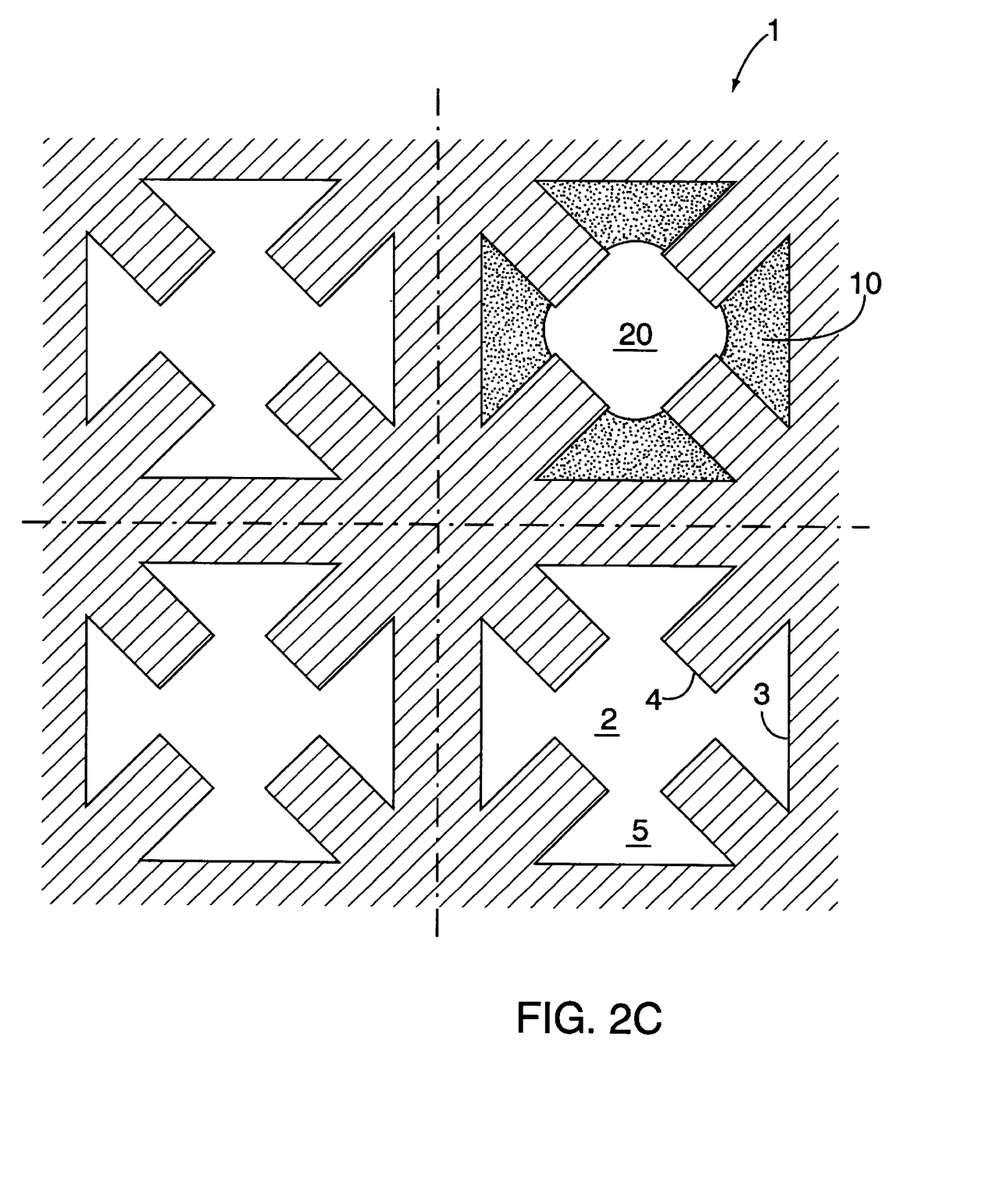
Figure 2D:
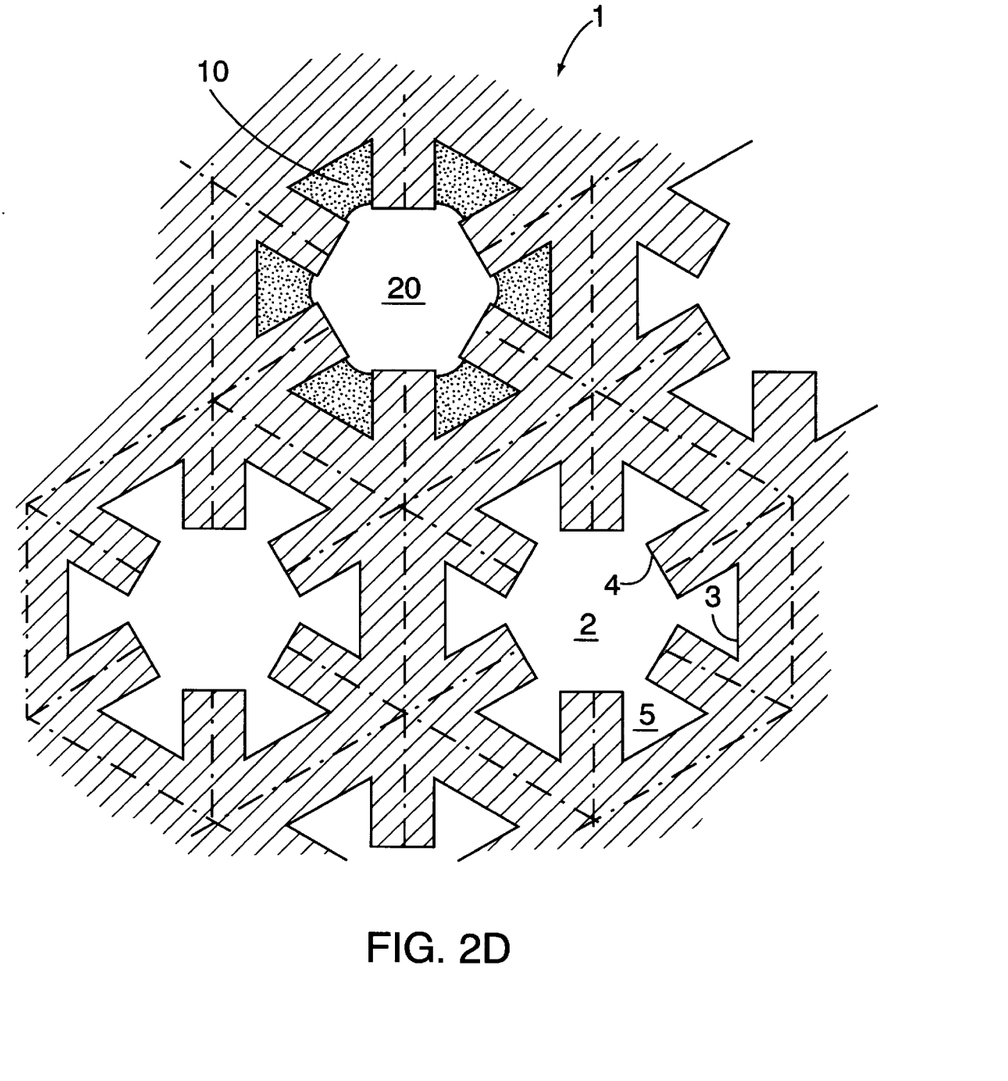

Channel 2 shown in FIG. 1 has a generally circular section. The channel may also have a polygonal section, such as for instance a triangle (FIG. 2B), a square (FIG. 2C), or a hexagon (FIG. 2D). This hexagonal geometry offers the particular advantage that a relatively high ratio of catalyst material volume to total volume can be realized, and that a relatively great contact surface between catalyst material and liquid phase can be realized.

Figure 2E:
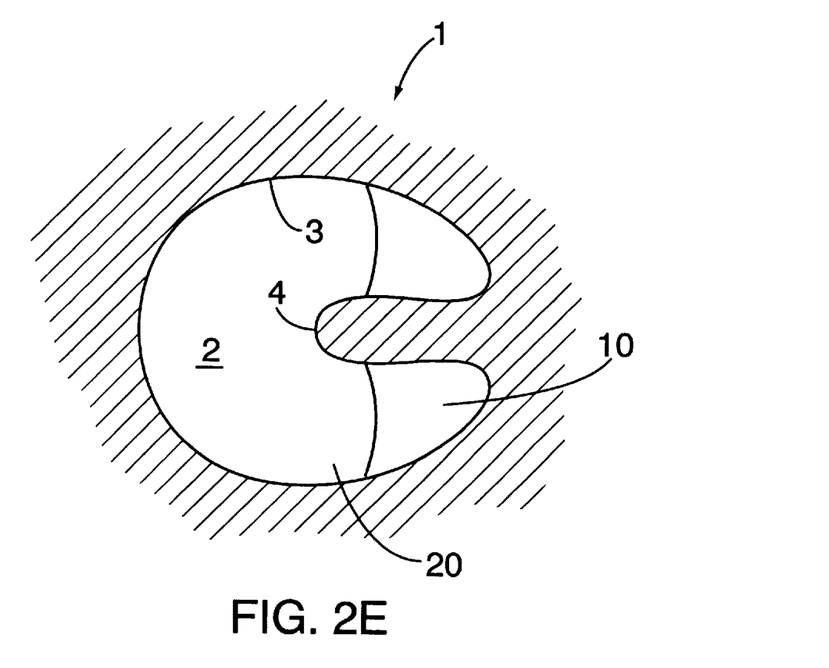

A capricious shape, as shown in FIG. 2E, is also conceivable, but from a productional viewpoint and in view of the efficiency, a rotation-symmetrical shape for the channels is preferred, although this is not at all necessary for realizing the effect aimed at by the invention.

Figure 2F:
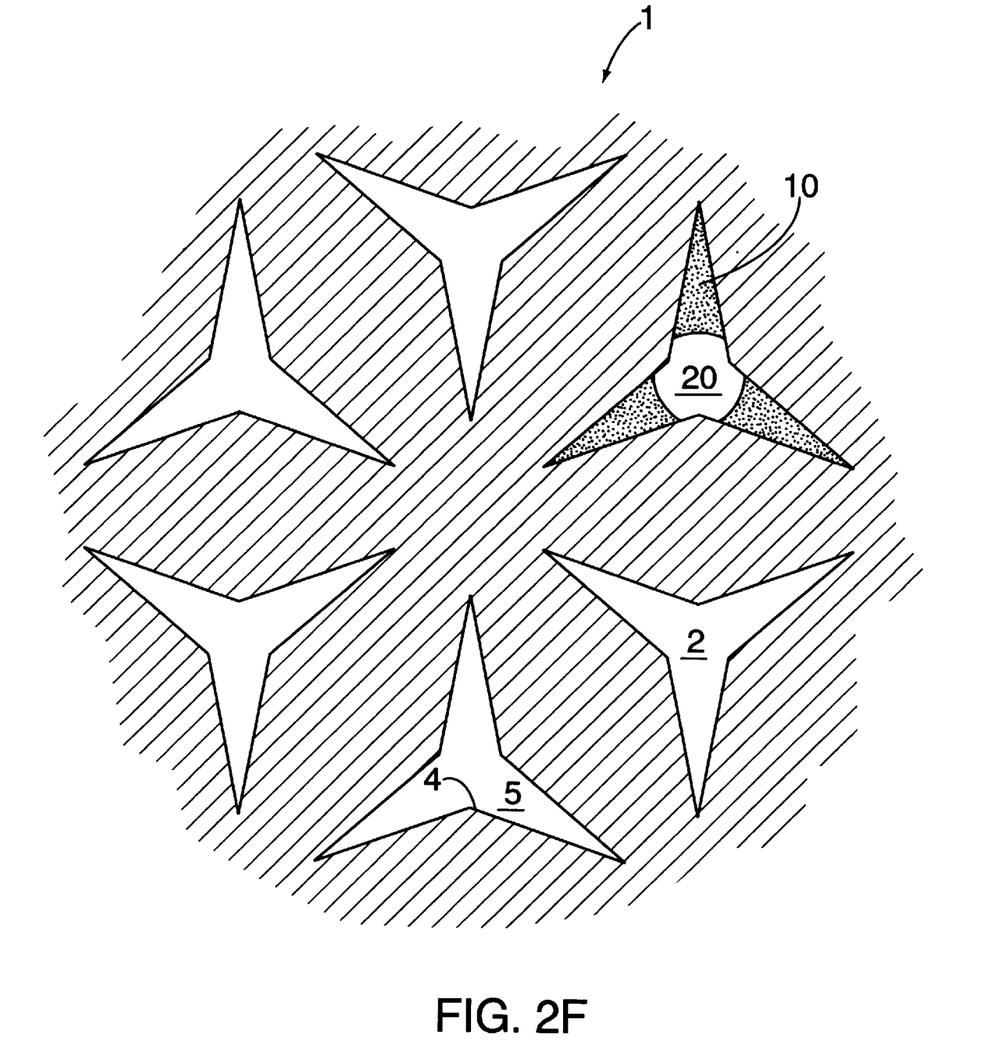

Also, the projections/grooves do not have to be only a part of the channel wall 3. FIG. 2F shows a variant in which the channel 2 has a triangular section and in which each projection 4 has a triangular section, the base of the projection 4 being as large as the triangle side of the channel 2. In this case, the top of each projection 4 can be regarded as a convex wall portion and the transition between adjacent projections 4 can be regarded as a concave wall portion.

The number of projections 4 per channel 2 can be varied. In the case of the circular section shown in FIG. 1, the number of six projections 4 per channel 2 is preferred for reasons of efficiency, but another number of projections 4, preferably evenly distributed along the circumference of the channel, is also possible. In the case of the polygon shapes illustrated in the FIGS. 2B–D and 2F, it is efficient, but not necessary, that the number of projections 4 per channel 2 corresponds to the number of angles of the respective polygon. 2n this connection, the projections 4 may be positioned in the respective angles of that polygon, as illustrated in the FIGS. 2C and 2D, but a better surface area/weight proportion is realized when the projections 4 are positioned on the polygon sides and preferably on the center thereof, as illustrated in FIG. 2B.

Figure 2G:
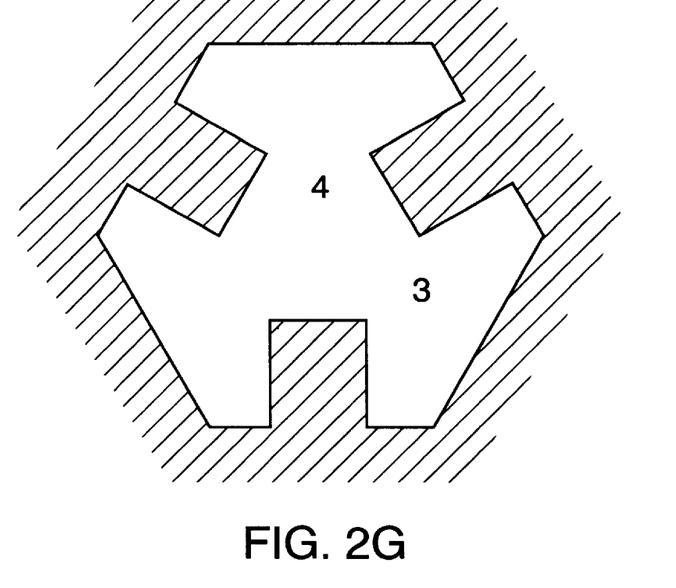
Figure 2H:
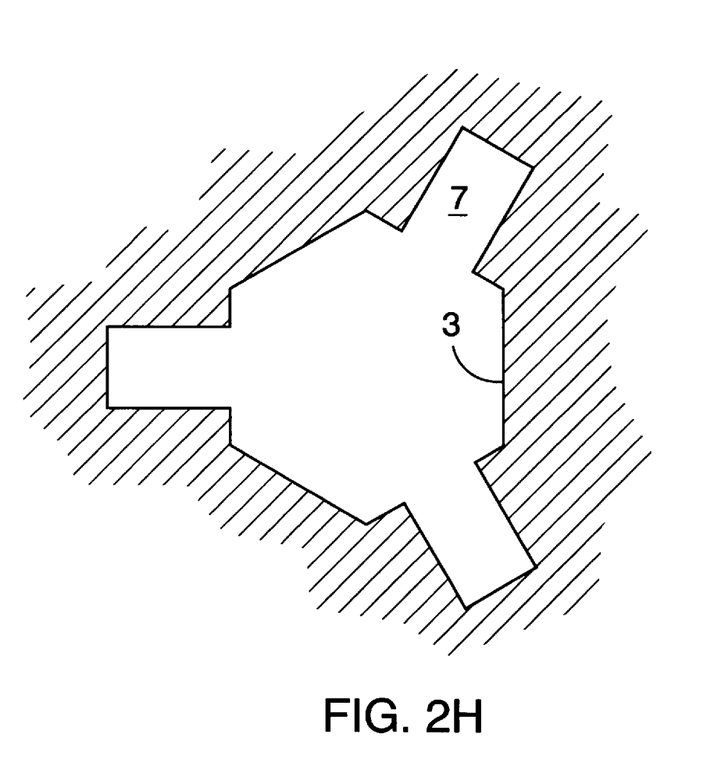
Figure 2I:
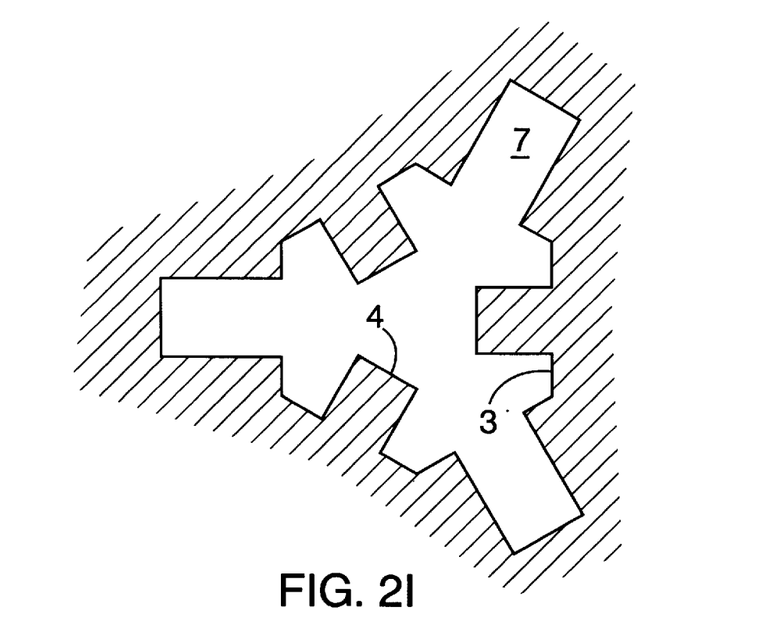

Hereinabove, the embodiment variant shown in FIG. 1, for instance, is described as a circular cross section having six longitudinal projections 4. However, this embodiment variant can also be described as a hexagonal cross section having walls 6 and having six longitudinal grooves 7 (shaped like a wedge of cake), positioned in six angles. FIG. 2G shows an embodiment variant having a hexagonal cross section and three projections 4, while FIG. 2H shows an embodiment variant having a hexagonal cross section and three grooves 7. A combination of projections 4 and grooves 7 is also conceivable (FIG. 2I).

Figure 2J:
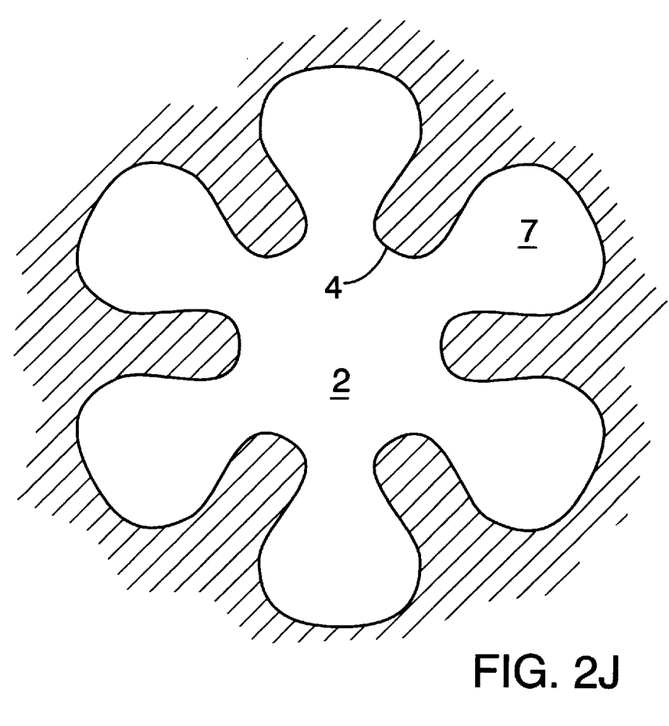

It is not necessary that the walls of the projections or grooves follow a flat plane, but those walls may also be curved. An example of such configuration is shown in FIGS. 2E, 2J and 2L.

Figure 2K:
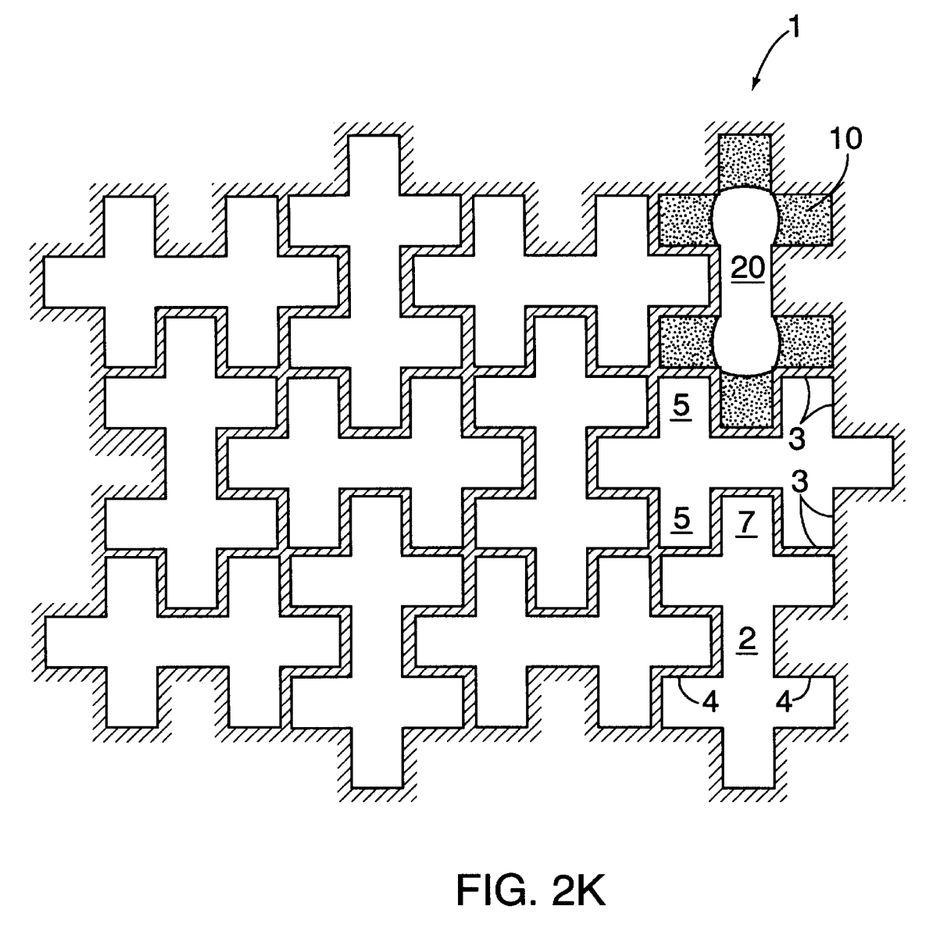

A particularly efficient use of the catalyst material is realized in a configuration in which the channels 2 comprise projections 4 and grooves 7, and the channels 2 are arranged in the catalyst element 1 in such a manner that the projections 4 and the grooves 7 of adjacent channels 2 mesh with each other. Examples of such a configuration are shown in FIGS. 2K and 2L. In the embodiment shown in FIG. 2K the channels 2 have a square section. Bach time, a rectangular projection 4 is positioned on the center of two opposite walls, while in the two other opposite walls a rectangular groove 7 is provided. Each channel 2 is adjoined by four channels whose orientation is perpendicular to that of channel 2 mentioned. In the embodiment shown the dimensions are chosen to be such that the catalyst walls located between the channels 2 are always equally thick. Further, the dimensions in this embodiment are chosen to be such that the spaces 5 surrounded by channel wall 3 and the projections 4 are equally large as the grooves 7.

Figure 2L:
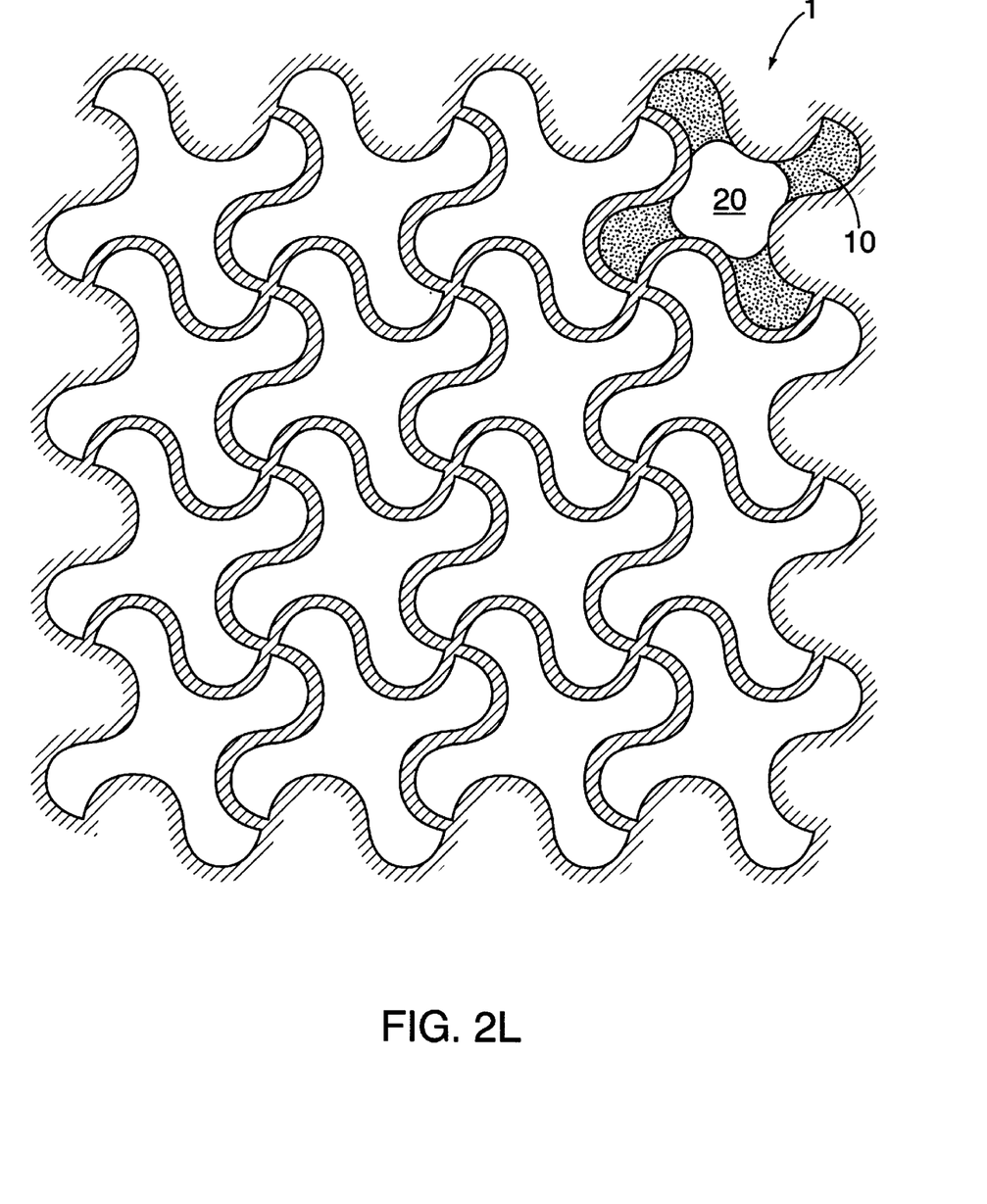

In the embodiment illustrated in FIG. 2L the channels 2 can be represented as having a square section as well. Provided side by side on each wall are a convex projection 4 and a concave groove 7, whose cross sections in the embodiment illustrated have the shape of a semicircle having a diameter substantially equalling half the side of each square. In this embodiment, too, the dimensions are chosen to be such that the catalyst walls located between the channels 2 are always equally thick. In this construction, the spaces 5 for receiving the liquid phase 10, always surrounded by a groove 7 and portions of the adjacent projections 4, have a sickel-shaped cross section.

In practice, the actual dimensions of the channels 2, the projections 4 and the grooves 7 will be adapted to the material properties of the substances to be fed through, in particular the liquid phase 10. In general, the height of the projections 4 and the depth of the grooves 7 will be chosen to be in the range between 5 and 50% of the relevant radius of the channel in question, with the relevant radius, depending on the configuration in question, been defined as the curvature radius of the channel wall portion at the location of the relevant projection or the relevant groove, or as the distance from that channel wall portion to the geometric center (center of gravity) of the channel in question.

Now, by way of an example, a comparison will be made between on the one hand conventional catalyst elements in the form of extruded cylinders having a length/diameter proportion of 4, and on the other hand a catalyst element 1 according to the embodiment illustrated in FIG. 1.

The conventional granules have for instance a diameter of 1.5 mm and a length of 6 mm. When these granules are dumped in a reactor, a filling degree of ca. 0.6 of the reactor is realized. In this connection, the filling degree is defined as the catalyst volume/available volume proportion.

Now, of the embodiment illustrated in FIG. 1, the mutual distance between the centers of the channels 2 is designated by L, the diameter of the channels 2 is designated by D, the width of the projections 4 is designated by x, and the height of the projections 4 is designated by y. In a practical embodiment the following choice can for instance be made:

$$d=0.8\ L;\ x=\pi/24\ D;\ y=0.25\ D.$$

In that case, it can be demonstrated in a simple manner that the filling degree is approximately 0.56, which is comparable with the filling degree of the conventional catalyst elements. In this embodiment, the proportion between the external catalyst surface area and the catalyst volume is approximately 10/L, while in the conventional catalyst elements this proportion is 4.5/d, d referring to the diameter of the conventional catalyst elements. Consequently, when L is chosen to be equal to 3.3 mm, the same proportion between the external catalyst surface area and the catalyst volume is realized as in the conventional catalyst elements.

It can be shown that in this case, in a practical situation, at a channel length of 20 m, a pressure drop for the gas of approximately 0.054 bar will occur, while for the liquid a pressure drop of approximately 0.68 bar will occur. This is a considerable improvement over the conventional situation, where a pressure drop of approximately 4.4 bar will occur under otherwise equal reaction circumstances.

Figure 3:
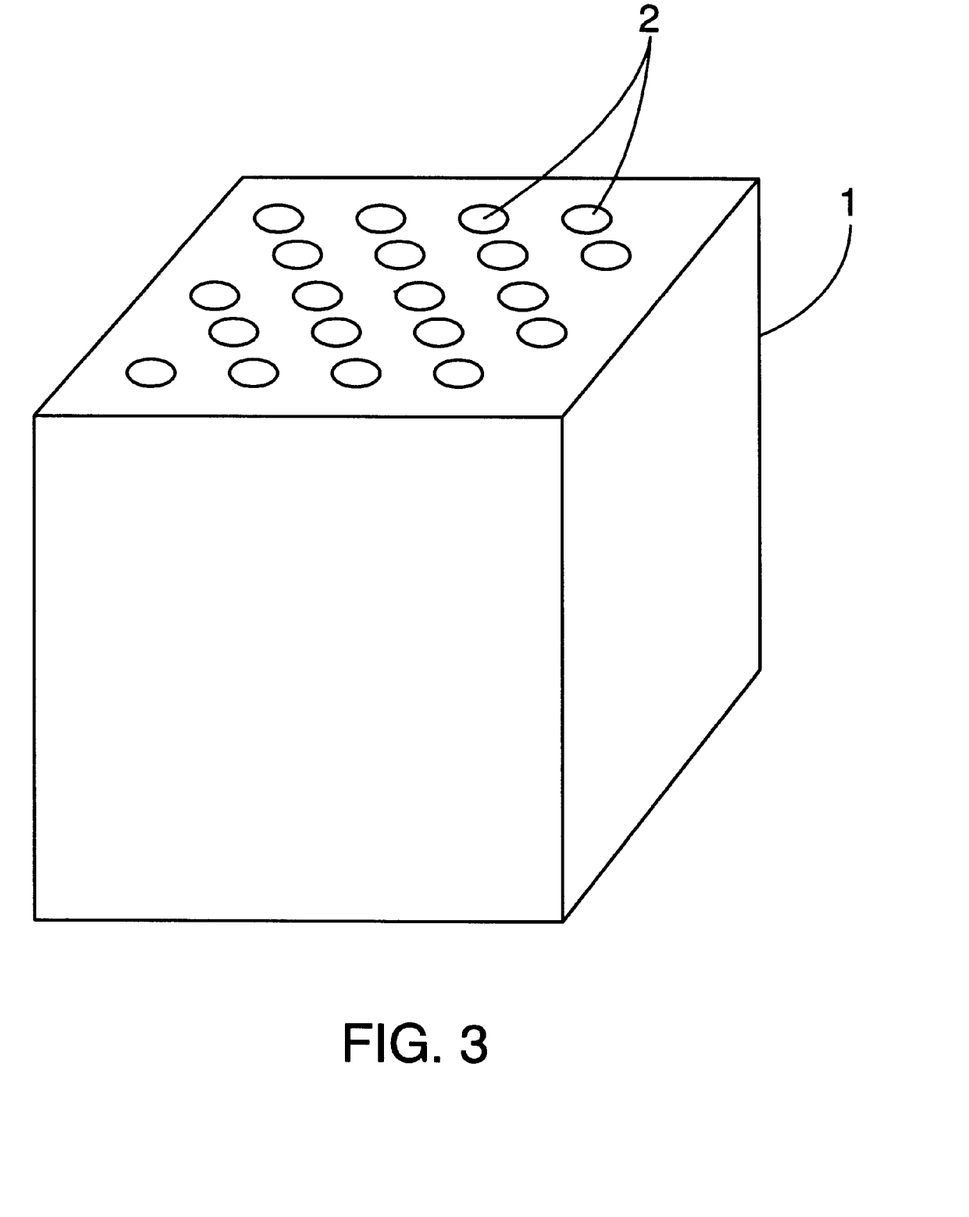
FIG. 3 is a perspective view of a catalyst element according to the invention.
Figure 4:
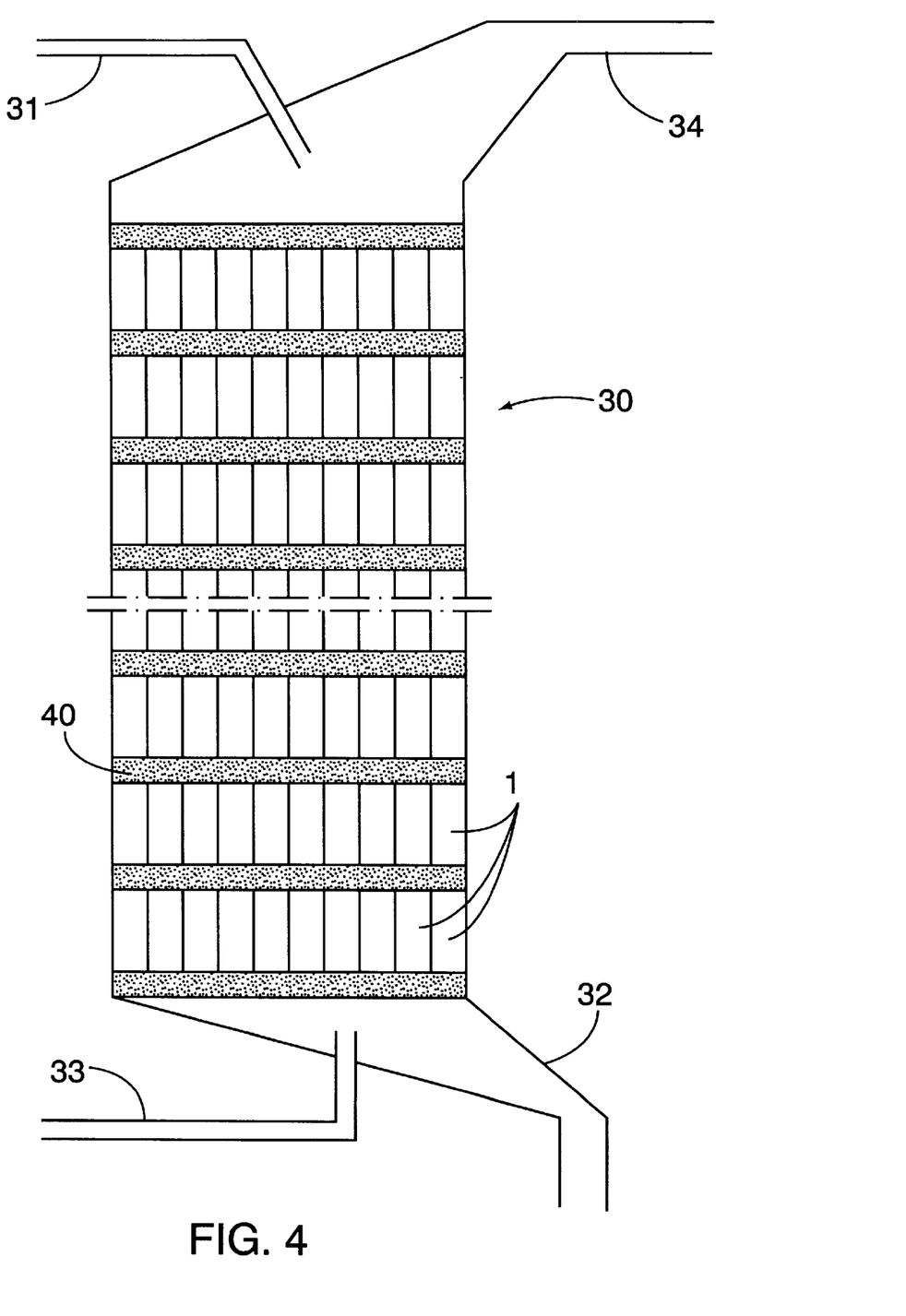
FIG. 4 is a side elevation of a reactor according to the invention.

A perspective view of a catalyst element a according to the invention with a square cross section is given in FIG. 3. In FIG. 3, the projection/groove structure of the channels 2 is not shown for the sake of simplicity. With the present-day production techniques, it is quite possible to produce this catalyst element with, within reasonable limits, any length and width. However, it is preferred to produce the catalyst elect I with a standardized length and width, for instance respectively 1 m and 50 cm, and to consider them to be modules with which a reactor 30 having any length and width, for instance respectively 20 m and 5 m, can be filled. FIG. 4 shows a schematic cross section of such a reactor 30, having a supply channel 31 and a discharge channel 32 for the liquid phase, and a supply channel 33 and a discharge channel 34 for the gas phase. The catalyst elements L are oriented such that the channels 2 are vertically directed. The supply channel 33 for the gas phase is arranged at the lower end of the reactor 30, and the gas is blown into it under slightly raised pressure. The supply channel 31 for the liquid phase is located at the top and of the reactor 30, and the pressure drop occurring in the reactor 20 is so small that the liquid can move downwards under the action of gravity.

In this embodiment, as is also shown in FIG. 4, a layer of a granular material 40, for instance conventional granular catalyst material, may be provided between the modules stacked on top of each other, effecting a redistribution and mixture of the reacting substances over the separate channels 2, between two successive layers of modules.

As is also mentioned, the particular advantage of the catalyst element 1 according to the present invention is that due to the intrinsically occurring phase separation in the channels 2, a slight pressure drop occurs, so that on the one hand only a slight pump capacity is needed and, more importantly, a countercurrent operation is possible. The advantages of a countercurrent operation will now be explained with reference to FIGS. 5A and 5B.

Figure 5A:
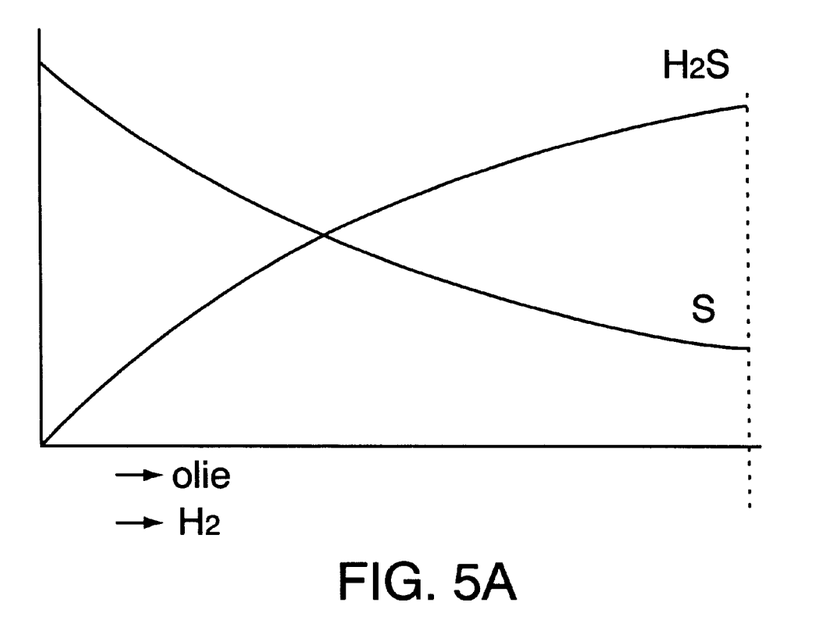
FIGS. 5A and 5B show graphs for explaining the advantages of a countercurrent mode.
Figure 5B:
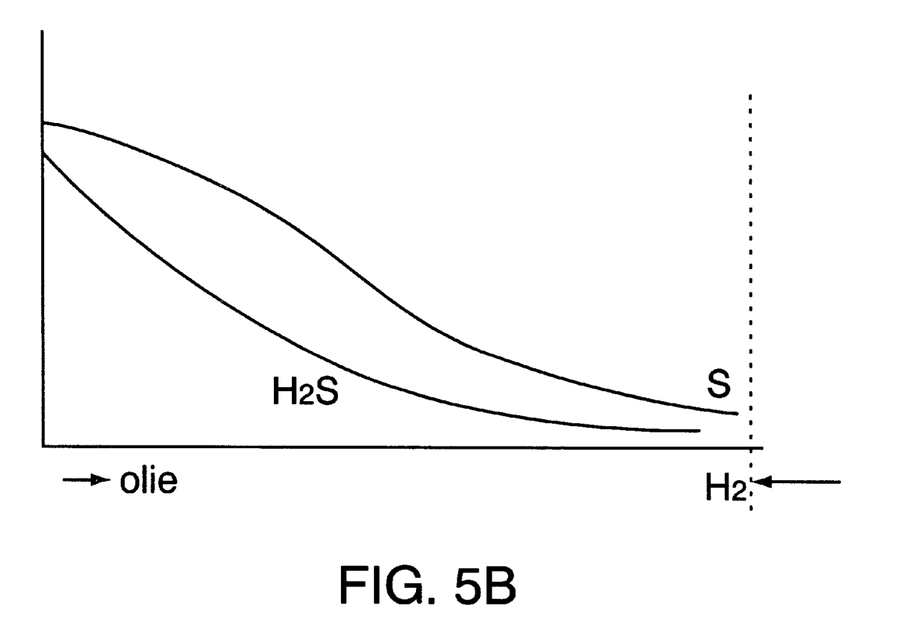

FIGS. 5A and 5B show in a graphic manner, in arbitrary units, the relation between the concentration of $H_2S$ in the gas phase and the concentration of sulfur (S) in the oil as function of the position in the reactor bed. The first graph (FIG. 5A) relates to a co-current mode, the oil and gas flow being from the left to the right. The second graph (FIG. 5B) relates to a countercurrent mode, the oil flow being from the left to the right and the gas flow being from the right to the left.

As appears from FIG. 5A, the oil in the entrance area of the reactor bed (in FIG. 5A on the left) is in an atmosphere substantially consisting of $H_2$. However, the $H_2S$ formed during the desulfurization is entrained with the gas and the oil, so that the concentration of $H_2S$ is relatively great in the greater part of the reactor bed, which counteracts the desulfurization reaction.

On the other hand, in the countercurrent mode, the formed $H_2S$ is entrained by the gas flow to the oil entrance area of the reactor bed and discharged from there. Here, it should be noted that the oil is in fact a mixture of different cc nets having different desulfurization rates. The contents that are easiest to desulfurize (greatest desulfurization rate) are already desulfurized in the oil entrance area of the reactor bed. Because of these factors, the concentration of $H_2S$ is relatively great in the oil entrance area and decreases strongly according as the oil progresses further in the reaction bed, such that the average concentration of $H_2S$ is less than in the co-current mode.

A significant consequence hereof is that at the and of the reactor bed in the very pure $H_2$ atmosphere, the components that are difficult to desulfurize (smallest desulfurization rate) are little obstructed by the counteraction of $H_2S$, as is indeed the case in the co-current mode. Consequently, the concentration of sulfur in the oil remaining at the end of the reactor bed is considerably less than in the co-current mode. Because at the and of the reactor bed the concentration of $H_2S$ is low, it is moreover possible here to use a catalyst elect of a material which is on the one hand particularly active but on the other hand Particularly sensitive to sulfur and/or $H_2S$. Precisely because of this sensitivity, such active catalyst material cannot normally be used in conventional catalyst elements.

Of course, it will be possible to connect two or more reactors in series, with the catalyst materials of the different reactors being mutually different. However, according to a further aspect of the present invention, in a reactor 30 of the type illustrated in FIG. 4, in which a number of modules are stacked on top of each other, the separate modules may have mutually different compositions, and in particular the modules at the discharge side of the liquid phase may be produced from such particularly active material which is particularly sensitive to sulfur and/or $H_2S$.

The catalyst element 1 according to the invention can be produced by means of an extrusion process, wherein a starting material is pressed through a die and is subsequently baked. In the extrusion art, it is conventional to produce such die with a high degree of precision while much care is given to the finishing operation of the wall of the extrusion opening to render the surface thereof as smooth as possible. Due to use, the die will wear in course of time and will then require further treatment. However, according to the invention the wall of the extrusion opening has a certain roughness that is not critical. On the one hand, this simplifies the production of the die, on the other hand, this means that further treatment because of wear will not be necessary, if at all. However, the most important effect of the roughness of the die is that the walls of the extruded channels in particular of the projections and grooves, will be provided with very small ridges in the longitudinal direction thereof, which ridges will promote the adhesion of the liquid to the channel wall and thereby promote the phase-separating capacity of the channels.

Summarizing, the invention provides a catalyst element which, due to the unique construction of the channels 2, i.e. the citation of concave wall portions and convex wall portions, preferably provided by longitudinal projections 4 or grooves 7 has an intrinsic phase-separating action so that a liquid phase 10 will preferentially be located in cavities 5 defined along the channel walls and a gas phase 20 will preferentially be located centrally in the channels 2. Consequently, the catalyst element 1 according to the invention is pre-eminently suitable for being operated in a countercurrent mode with only a slight loss of pressure.

It will be understood by a skilled person that various modifications are possible with the scope of the present invention. For instance, it is possible to provide a catalyst element with channels having mutually different configurations.

We claim:

1. Catalytic reactor for reaction of a gas with a liquid including
    (a) at least one monolithic catalytic element having at least one longitudinal finned channel extending therethrough, the walls of said finned channel having at least one convex portion and at least one concave portion, the surface of said at least one longitudinal finned channel forming catalyst material for said reaction;
    (b) a supply channel and a discharge channel for liquid positioned at the top and bottom of the reactor, respectively, and a supply channel and a discharge channel for gas positioned at the bottom and top of the reactor, respectively, such that the gas flows through the central portion of said at least one longitudinal finned channel and the liquid flows countercurrently through cavities surrounding the central portion, said cavities defined by the at least one convex portion and said at least one concave portion along the channel walls.

2. Catalytic reactor in accordance with claim 1 wherein said at least one catalytic element comprises a plurality of catalytic elements, being stacked on top of each other and a distribution layer comprising a granular material positioned between at least two of the catalytic elements.

3. Catalytic reactor in accordance with claim 1 wherein said at least one convex portion comprises at least one longitudinal projection and said at least one concave portion comprises at least one longitudinal groove.

4. Catalytic reactor in accordance with claim 3 wherein the at least one projection is provided with walls which are parallel to each other and the at least one groove is provided with walls which are parallel to the opposite walls of an adjacent groove.

5. Catalytic reactor in accordance with claim 3 wherein the channel of said catalytic elements includes a circular section and the sum of the projection and groove equals six.

6. Catalytic reactor in accordance with claim 3 wherein the catalyst channel is in the form of a polygon and the number of projection per channel corresponds with the number of angles of said polygon, the projections being positioned on the sides of said polygon.

7. Catalytic reactor in accordance with claim 3 wherein said projection and said groove are provided with walls having ridges extending in the longitudinal direction of the channel.

8. Catalytic reactor in accordance with claim 3 wherein the channels of said catalytic element is vertically positioned.

* * * * *